US007829177B2

(12) United States Patent
Russell et al.

(10) Patent No.: US 7,829,177 B2
(45) Date of Patent: Nov. 9, 2010

(54) WEB MATERIALS HAVING OFFSET EMBOSS PATTERNS DISPOSED THEREON

(75) Inventors: Matthew Alan Russell, Monroe, OH (US); Donn Nathan Boatman, Union, KY (US); Kevin Mitchell Wiwi, West Chester, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 550 days.

(21) Appl. No.: 11/147,819

(22) Filed: Jun. 8, 2005

(65) Prior Publication Data

US 2006/0278354 A1 Dec. 14, 2006

(51) Int. Cl.
*B32B 3/00* (2006.01)
*B31F 1/12* (2006.01)

(52) U.S. Cl. ........................ 428/156; 428/153; 428/187

(58) Field of Classification Search ................. 428/156, 428/152–154, 187; 162/109, 117; D5/53
See application file for complete search history.

(56) References Cited

U.S. PATENT DOCUMENTS

| | | | |
|---|---|---|---|
| 1,863,973 | A | 6/1932 | Ellis, Jr. |
| 2,177,490 | A | 10/1939 | Kieffer |
| 2,284,663 | A | 6/1942 | Kieffer |
| 3,301,746 | A | 1/1967 | Sanford et al. |
| 3,473,576 | A | 10/1969 | Amneus |
| 3,573,164 | A | 3/1971 | Norman et al. |
| 3,821,068 | A | 6/1974 | Shaw |
| 3,953,638 | A | 4/1976 | Kemp |
| 3,974,025 | A | 8/1976 | Ayers |
| 4,191,609 | A | 3/1980 | Trokhan |
| 4,239,065 | A | 12/1980 | Trokhan |
| 4,300,981 | A | 11/1981 | Carstens |
| 4,307,141 | A | 12/1981 | Walbrun |
| 4,320,162 | A | 3/1982 | Schulz |
| 4,483,728 | A | 11/1984 | Bauernfeind |
| 4,514,345 | A | 4/1985 | Johnson et al. |
| 4,528,239 | A | 7/1985 | Trokhan |
| 4,529,480 | A | 7/1985 | Trokhan |
| 4,609,518 | A | 9/1986 | Curro et al. |
| 4,629,643 | A | 12/1986 | Curro et al. |
| 4,637,859 | A | 1/1987 | Trokhan |
| 4,659,608 | A | 4/1987 | Schulz |
| 4,671,983 | A | 6/1987 | Burt |
| 4,803,032 | A | 2/1989 | Schulz |
| 4,921,034 | A | 5/1990 | Burgess et al. |
| 4,927,588 | A | 5/1990 | Schulz |
| 5,030,081 | A | 7/1991 | Schulz |

(Continued)

FOREIGN PATENT DOCUMENTS

| | | | |
|---|---|---|---|
| EP | 0 112 654 | A1 | 7/1984 |

(Continued)

*Primary Examiner*—David R Sample
*Assistant Examiner*—Catherine Simone
(74) *Attorney, Agent, or Firm*—Roddy M. Bullock; Betty J. Zea; Stephen T. Murphy

(57) ABSTRACT

A web substrate comprising a plurality of embossment regions and an embossment pattern for a web substrate are disclosed. Each of the embossment regions is bounded by a first axis and a second axis orthogonal thereto. Each of the first axis are collectively elongate and each of the second axis are collectively parallel and discontinuous.

11 Claims, 3 Drawing Sheets

U.S. PATENT DOCUMENTS

| | | | |
|---|---|---|---|
| 5,093,068 | A | 3/1992 | Schulz |
| 5,202,173 | A | 4/1993 | Wu et al. |
| 5,245,025 | A | 9/1993 | Trokhan et al. |
| 5,246,785 | A | 9/1993 | Matano et al. |
| 5,275,700 | A | 1/1994 | Trokhan |
| 5,294,475 | A | 3/1994 | McNeil |
| 5,296,184 | A | 3/1994 | Wu et al. |
| 5,328,565 | A | 7/1994 | Rasch et al. |
| 5,334,289 | A | 8/1994 | Trokhan et al. |
| 5,364,504 | A | 11/1994 | Smurkoski et al. |
| 5,411,636 | A | 5/1995 | Hermans et al. |
| 5,490,902 | A | 2/1996 | Schulz |
| 5,496,603 | A | 3/1996 | Riedel et al. |
| 5,518,801 | A | 5/1996 | Chappell et al. |
| 5,527,428 | A | 6/1996 | Trokhan et al. |
| 5,554,143 | A | 9/1996 | Roe et al. |
| 5,554,144 | A | 9/1996 | Roe et al. |
| 5,554,145 | A | 9/1996 | Roe et al. |
| 5,556,394 | A | 9/1996 | Roe et al. |
| 5,556,509 | A | 9/1996 | Trokhan et al. |
| 5,569,232 | A | 10/1996 | Roe et al. |
| 5,573,830 | A | 11/1996 | Schulz |
| 5,620,776 | A | 4/1997 | Schulz |
| 5,628,876 | A | 5/1997 | Ayers et al. |
| 5,629,052 | A | 5/1997 | Trokhan et al. |
| 5,637,194 | A | 6/1997 | Ampulski et al. |
| 5,686,168 | A | 11/1997 | Laurent et al. |
| 5,691,035 | A | 11/1997 | Chappell et al. |
| 5,723,087 | A | 3/1998 | Chappell et al. |
| 5,749,866 | A | 5/1998 | Roe et al. |
| 5,846,636 | A | 12/1998 | Ruppel et al. |
| 5,891,544 | A | 4/1999 | Chappell et al. |
| 5,916,663 | A | 6/1999 | Chappell et al. |
| 5,947,948 | A | 9/1999 | Roe et al. |
| 5,993,432 | A | 11/1999 | Lodge et al. |
| 6,027,483 | A | 2/2000 | Chappell et al. |
| 6,143,131 | A | 11/2000 | Dwiggins et al. |
| 6,235,373 | B1 * | 5/2001 | Graff .......................... 428/172 |
| 6,245,273 | B1 | 6/2001 | Wendler, Jr. |
| 6,251,207 | B1 | 6/2001 | Schultz et al. |
| 6,254,965 | B1 | 7/2001 | McGuire et al. |
| 6,261,666 | B1 * | 7/2001 | Enderby et al. ............. 428/172 |
| 6,287,422 | B1 | 9/2001 | Harper et al. |
| 6,299,729 | B1 | 10/2001 | Heath et al. |
| 6,325,787 | B1 | 12/2001 | Roe et al. |
| 6,361,308 | B2 | 3/2002 | Wendler, Jr. |
| 6,383,431 | B1 | 5/2002 | Dobrin et al. |
| 6,413,614 | B1 | 7/2002 | Giesler, Sr. et al. |
| 6,455,129 | B1 | 9/2002 | Kershaw et al. |
| 6,458,447 | B1 | 10/2002 | Cabell et al. |
| 6,540,879 | B2 | 4/2003 | Marinack et al. |
| 6,579,594 | B2 | 6/2003 | Wendler, Jr. |
| 6,589,634 | B2 | 7/2003 | Schultz et al. |
| 6,602,577 | B1 * | 8/2003 | Ostendorf et al. ........... 428/156 |
| 6,694,872 | B1 | 2/2004 | LaBelle et al. |
| 6,706,028 | B2 | 3/2004 | Roe et al. |
| 6,783,823 | B2 | 8/2004 | Lasson et al. |
| 6,830,800 | B2 | 12/2004 | Curro et al. |
| 6,863,960 | B2 | 3/2005 | Curro et al. |
| 2002/0105110 | A1 | 8/2002 | Dobrin et al. |
| 2004/0009327 | A1 | 1/2004 | Saarvali et al. |
| 2004/0224132 | A1 | 11/2004 | Roe et al. |
| 2004/0253297 | A1 | 12/2004 | Hedges et al. |
| 2005/0003152 | A1 | 1/2005 | Thomas et al. |

FOREIGN PATENT DOCUMENTS

| | | | |
|---|---|---|---|
| EP | 0 684 132 | A1 | 11/1995 |
| WO | WO 00/73585 | A1 | 12/2000 |
| WO | WO 02/28630 | A2 | 4/2002 |

* cited by examiner

WEB MATERIALS HAVING OFFSET EMBOSS PATTERNS DISPOSED THEREON

FIELD OF THE INVENTION

The present invention relates to embossed products having an offset embossing pattern. More particularly, the present invention relates to embossed paper products, such as tissue and towel products, having an offset embossing pattern disposed thereon.

BACKGROUND OF THE INVENTION

Cellulosic fibrous webs, such as tissue products, are in almost constant use in daily life. Toilet tissue, paper towels, and facial tissue are examples of cellulosic fibrous web materials used throughout home and industry. Although consumers have long accepted a cellulosic fibrous web that remains unaltered from the base sheet, there is a need for such cellulosic fibrous webs to have a consumer acceptable aesthetic appearance. This aesthetic appearance of a cellulosic fibrous web can provide consumers with the impression of a high quality product. It may also be desirable to impact the cellulosic fibrous web with a certain amount of bulkiness. The property of bulk can be desirable for high quality products because it is associated with both softness and absorbency from a consumer viewpoint.

Likewise, embossing paper products to make the product more absorbent, softer, and bulkier, over similar products that are unembossed, is known in the art. Embossing technology includes pin-to-pin embossing where protrusions on the respected embossing rolls are matched such that the tops of the protrusions contact each other through the paper product, thereby compressing the fibrous structure of the product. The technology includes male to female embossing, also known as nested embossing, where protrusions of one or both rolls are aligned with either a non-protrusion area or a female recession in the other roll. Exemplary embossed products and processes for embossing products are disclosed in U.S. Pat. Nos. 3,953,638; 4,320,162; 4,659,608; 4,921,034; 5,246,785; 5,490,902; 6,287,422; 6,299,729; 6,413,614; 6,455,129; 6,458,447; 6,540,879; 6,694,872; and 6,783,823.

In addition, exemplary products and processes that provide for the deep-nested embossing of multi-ply tissue products are disclosed in U.S. Pat. Nos. 5,294,475 and 5,686,168. While these technologies can be useful in order to improve the embossing efficiency and glue bonding of multi-ply tissues, it has been observed that when certain embossing patterns are produced, the resulting tissue paper can be less soft, less absorbent, and exhibit lines of strain when the web material is in a tensioned condition. It has also been found that these lines of strain remain even after tension has been removed from the tissue paper. This can be particularly true for embossed products where the embossing pattern has an aligned orientation. “Aligned” is intended to mean that the centers of any given set of embossment regions of an embossing pattern are collinear with respect to at least two axis of the tissue paper. Thus, as would be expected, products having any of these less than desirable characteristics can have less than desirable softness and absorbency and detract significantly from the appearance of the product. Lines of strain in a tensioned web product can provide difficulties in web handling and produce end products that are irregular and/or have a puckered appearance.

Thus, in order to overcome these problems, it would be advantageous to provide a web product having a pattern embossed thereon that has an offset, or shifted, appearance. In particular, it would be advantageous to produce an embossed paper product that has an offset, or shifted, emboss pattern disposed thereon, that provides a paper product having absorbency, softness, and bulk characteristics at least as good as those of previously embossed products but improved strain characteristics of those same previously embossed products. Such a product could have an improved appearance and provide improved web handling characteristics over such previously embossed products.

SUMMARY OF THE INVENTION

The present invention provides a web substrate comprising a plurality of embossment regions. Each of the embossment regions is bounded by a plurality of axes. A first embossment region of the plurality of embossment regions has only one first axis of the plurality of axes collinear with a second embossment region.

The present invention also provides a web substrate comprising a plurality of embossment regions. Each of the embossment regions is bounded by a plurality of axes. Only a first axis of the plurality of axes bounding each of adjacent embossment regions of the plurality of embossment regions are collinear.

The present invention further provides an embossment pattern for a web substrate. The embossment pattern comprises a plurality of embossment regions. Each of the embossment regions is bounded by a plurality of axes. Only a first axis of the plurality of axes bounding each of adjacent embossment regions of the plurality of embossment regions are collinear.

DETAILED DESCRIPTION OF THE INVENTION

Figure 1:
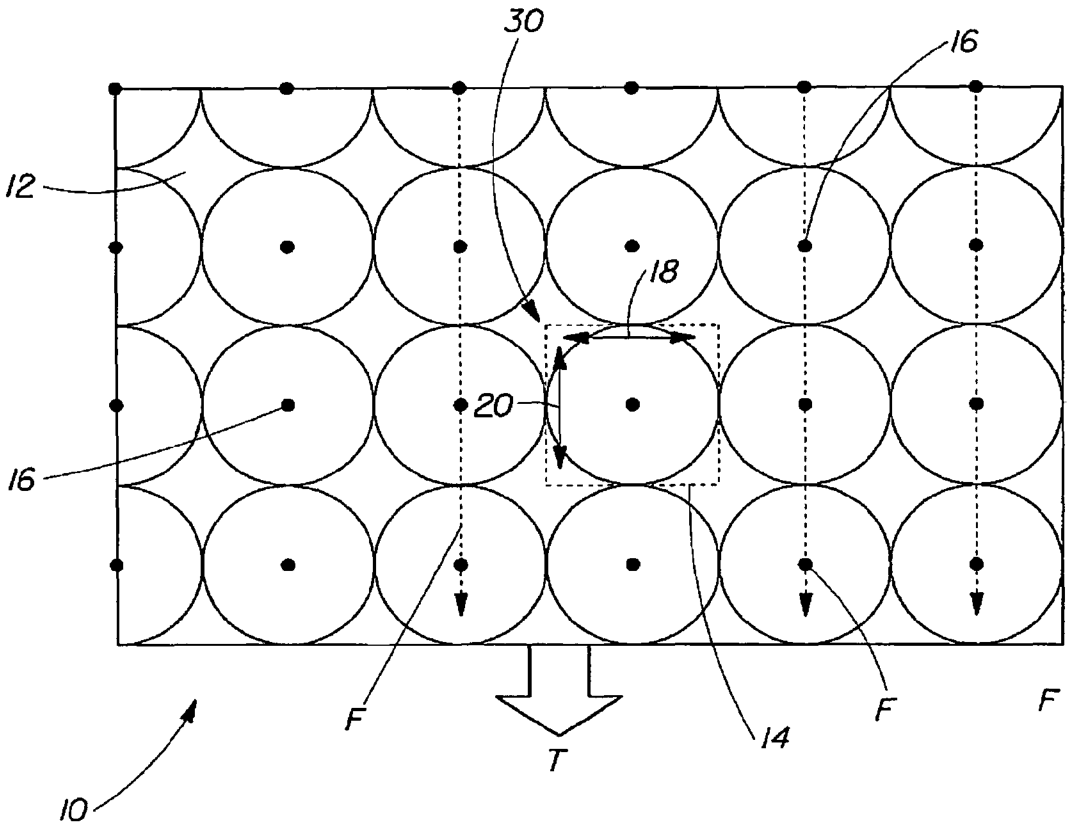
Fig. 1 (Prior Art)
FIG. 1 is an exemplary embossing pattern showing a regular pattern of embossments as should be known in the prior art.

The present invention relates to embossing patterns for web substrates, such as embossed tissue towels and other paper products, preferably comprising one or more plies of paper where at least one of the plies of paper comprises a plurality of embossment regions and each embossment region is bounded by a plurality of axes. A first embossment region is provided with only one first axis that is collinear with a second embossment region. In a preferred embodiment, only a first axis bounding each of adjacent embossment regions are collinear. In yet another embodiment, each of the plurality of embossment regions is bounded by a first axis and a second axis substantially orthogonal thereto. The first axis of each embossment region are collectively elongate. The second axis of each embossment region are collectively parallel and discontinuous. In a preferred embodiment, the at least one embossed plies has a total embossed area of less than or equal to about 20% and an average embossment height of at least 500 μm. In a particularly preferred embodiment, the at least one embossed ply has an E factor of between about 0.0150 and about 1.0000 inches$^4$/number of embossments.

The terms “absorbent capacity” and “absorbency” means the characteristic of a ply or plies of a fibrous structure that allows the fibrous structure to take up, entrain, and retain fluids, particularly water and aqueous solutions and suspensions. In evaluating the absorbency of paper, the absolute quantity of fluid a given amount of paper will hold is significant as well as the rate at which the paper will absorb a fluid. Absorbency is measured by the horizontal full sheet (HFS) test method described infra.

The term "machine direction" (MD) refers to the dimension of a web material that is parallel to the direction of travel. "Cross-machine direction" (CD) refers to the dimension of a web material that is coplanar with the MD but orthogonal thereto. The "z-direction" refers to the dimension of a web material that is orthogonal to both the MD and CD.

A "tissue-towel paper product" refers to creped and/or uncreped products comprising paper tissue or paper towel technology in general, including, but not limited to, conventionally felt-pressed or conventional wet-pressed tissue paper, pattern densified tissue paper, starch substrates, and high bulk, uncompacted tissue paper. Non-limiting examples of tissue-towel paper products include toweling, facial tissue, bath tissue, table napkins, and the like.

The term "ply" means an individual sheet of fibrous structure having an end use as a tissue-towel paper product. A ply may comprise one or more wet-laid layers, air-laid layers, and/or combinations thereof. If more than one wet-laid layer is used, it is not necessary for each layer to be made from the same fibrous structure. Further, the layers may or may not be homogenous within a layer. The actual makeup of a tissue paper ply is generally determined by the desired benefits of the final tissue-towel paper product, as would be known to one of skill in the art.

The term "fibrous structure" as used herein means an arrangement of fibers produced in any papermaking machine known in the art to create a ply of tissue-towel paper. "Fiber" means an elongate particulate having an apparent length greatly exceeding its apparent width. More specifically, and as used herein, fiber refers to such fibers suitable for a paper making process. The present invention contemplates the use of variety of paper making fibers, such as, natural fibers, synthetic fibers, as well as any other suitable fibers, starches, and combinations thereof. Paper making fibers useful in the present invention include cellulosic fibers commonly known as wood pulp fibers. Applicable wood pulps include chemical pulps, such as Kraft, sulfite and sulfate pulps, as well as mechanical pulps including, groundwood, thermomechanical pulp, chemically modified, and the like. Chemical pulps, however, may be preferred since they are known to those of skill in the art to impart a superior tactical sense of softness to tissue sheets made therefrom. Pulps derived from deciduous trees (hardwood) and/or coniferous trees (softwood) can be utilized herein. Such hardwood and softwood fibers can be blended or deposited in layers to provide a stratified web. Exemplary layering embodiments and processes of layering are disclosed in U.S. Pat. Nos. 3,994,771 and 4,300,981. Additionally, fibers derived from wood pulp such as cotton linters, bagesse, and the like, can be used. Additionally, fibers derived from recycled paper, which may contain any of all of the categories as well as other non-fibrous materials such as fillers and adhesives used to manufacture the original paper product. In addition, fibers and/or filaments made from polymers, specifically hydroxyl polymers, may be used in the present invention. Non-limiting examples of suitable hydroxyl polymers include polyvinyl alcohol, starch, starch derivatives, chitosan, chitosan derivatives, cellulose derivatives, gums, arabinans, galactans, and combinations thereof. Additionally, other synthetic fibers such as rayon polyethylene and polypropylene fibers can be used within the scope of the present invention. Further, such fibers may be latex bonded. Other materials are also intended to be within the scope of the present invention as long as they do not interfere or counter act any advantage presented by the instant invention.

As would be known to one of skill in the art, surfactants may be used to treat tissue paper webs if enhanced absorbency is required. In a preferred embodiment, surfactants can be used at a level ranging from about 0.01% to about 2.0% by weight based on the dry fiber weight of the tissue web. Preferred surfactants have alkyl chains having at least 8 carbon atoms. Exemplary anionic surfactants include, but are not limited to, linear alkyl sulfonates and alkylbenzene sulfonates. Exemplary, but non-limiting non-ionic surfactants include alkylglycosides, esters therefrom, and alkylpolyethoxylated esters. Further, as would be known to one of skill in the art, cationic softener active ingredients with a high degree of unsaturated (mono and/or poly) and/or branched chain alkyl groups can enhance absorbency.

It is also intended that other chemical softening agents may be used in accordance with the present invention. Such preferred chemical softening agents may comprise quaternary ammonium compounds such as dialkyldimethylammonium salts, mono- or di-ester variations therefrom, and organo-reactive polydimethyl siloxane ingredients such as amino functional polydimethyl siloxane.

It is also intended that the present invention may incorporate the use of at least one or more plies of non-woven webs comprising synthetic fibers. Such exemplary substrates include textiles, other non-woven substrates, latex bonded web substrates, paper-like products comprising synthetic or multi-component fibers, and combinations thereof. Exemplary alternative substrates are disclosed in U.S. Pat. Nos. 4,609,518 and 4,629,643; and European Patent Application EP A 112 654.

A tissue-towel paper product substrate may comprise any tissue-towel paper product known in the industry and to those of skill in the art. Exemplary substrates are disclosed in U.S. Pat. Nos. 4,191,609; 4,300,981; 4,514,345; 4,528,239; 4,529,480; 4,637,859; 5,245,025; 5,275,700; 5,328,565; 5,334,289; 5,364,504; 5,411,636; 5,527,428; 5,556,509; 5,628,876; 5,629,052; and 5,637,194.

Preferred tissue-towel product substrates may be through air dried or conventionally dried. Optionally, a preferred tissue-towel product substrate may be foreshortened by creping or wet micro-contraction. Exemplary creping and/or wet-micro contraction processes are disclosed in U.S. Pat. Nos. 4,191,756; 4,440,597; 5,865,950; 5,942,085; and 6,048,938.

Further, conventionally pressed tissue paper and methods for making such paper are known in the art. A preferred tissue paper is pattern densified tissue paper that is characterized by having a relatively high bulk field of relatively low fiber density and an array of densified zones of relatively high fiber density. The high bulk field is alternatively characterized as a field of pillow regions. The densified zones are alternatively referred to as knuckle regions. The densified zones may be discretely spaced within the high bulk field or maybe interconnected, either fully or partially, within the high bulk field. Exemplary processes for producing pattern densified tissue webs are disclosed in U.S. Pat. Nos. 3,301,746; 3,473,576; 3,573,164; 3,821,068; 3,974,025; 4,191,609; 4,239,065; 4,528,239; and 4,637,859.

An exemplary process for embossing a web substrate in accordance with the present invention incorporates the use of a deep-nested embossment technology. By way of a non-limiting example, a tissue ply structure is embossed in a gap between two embossing rolls. The embossing rolls may be made from any material known for making such rolls, including, without limitation, steel, rubber, elastomeric materials, and combinations thereof. As known to those of skill in the art, each embossing roll may be provided with a combination of emboss knobs and gaps. Each emboss knob comprises a knob base and a knob face. The surface pattern of the rolls, that is the design of the various knobs and gaps, may be any design desired for such a product. However, in accordance with the deep-nested embossment process of the present invention, the roll designs should be matched such that the knob face of one roll extends into the gap of the other roll beyond the knob face of the other roll in order to create a depth of engagement. A depth of engagement is the distance between the nested knob faces. The depth of engagement can be used to produce paper products and can typically preferably ranges from about 0.04 inches (1.02 mm) to about 0.180 inches (4.57 mm), more preferably from about 0.100 inches (2.54 mm) to about 0.170 inches (4.32 mm), and even more preferably from about 0.120 inches (3.05 mm) to about 0.160 inches (4.06 mm). Such a process can provide for individual and/or collective embossments for a deep-nested embossed product having embossments preferably with an embossment height of at least about 500 μm, more preferably at least about 650 μm, even more preferably at least about 1000 μm, yet still more preferably at least about 1250 μm, and most preferably at least about 1400 μm.

As would be known to one of skill in the art, the plurality of embossments of the embossed tissue paper product of the present invention could be configured in a non-random pattern of positive embossments and a corresponding non-random pattern of negative embossments. Further, such positive and negative embossments may be embodied in random patterns as well as combinations of random and non-random patterns. By convention, positive embossments are embossments that protrude toward the viewer when the embossed product is viewed from above the surface of the web. Conversely, negative embossments are embossments that appear to push away from the viewer when the embossed product is viewed from above a surface.

The embossed tissue-towel paper product of the present invention may comprise one or more plies of tissue paper, preferably two or more plies. Preferably at least one of the plies comprises a plurality of embossments. When the embossed paper product comprises two or more plies of tissue structure, the plies may be the same substrate respectively, or the plies may comprise different substrates combined to create any desired consumer benefit(s). Some preferred embodiments of the present invention comprise two plies of tissue substrate. Another preferred embodiment of the present invention comprises a first outer ply, a second outer ply, and at least one inner ply. Further, a preferred embodiment of the present invention preferably will have a total embossed area of less than or equal to about 20%, more preferably less than or equal to about 15%, even more preferably less than or equal to about 10%, and most preferably less than or equal to about 8%. Embossed area, as used herein, means the area of the paper structure that is directly compressed by either positive or negative embossing knobs. Portions of the paper substrate that are deflected as a result of engagement between positive and negative embossment knobs are not considered part of the embossed area.

The embossed product of the present invention may comprise only one ply of such a deep-nested, embossed substrate. Such an exemplary process can facilitate the combination of one ply that is deep-nested embossed and other non-embossed plies. Alternatively, at least two plies can be combined and then embossed together in such a deep-nested, embossing process. An exemplary embodiment of the latter combination provides an embossed tissue-towel paper comprising more than one ply where the first and second outer plies are deep-nested embossed and the resulting deep-nested and embossed plies are subsequently combined with one or more additional plies of the tissue substrate.

Referring to FIG. 1, a typical paper product 10 provides an embossed tissue paper product 12 comprising a plurality of embossments 14 disposed thereon. The embossed tissue-towel paper product 10 is generally provided with one or more plies of tissue structure 12, where in at least one of the plies comprises a plurality of embossments 14. The ply, or plies, that are embossed are generally provided with an embossing process as described supra.

The prior art also defines a relationship between the sized dimension (i.e., area) of the individual embossments 14 and the total number of embossments provided upon the tissue-towel paper product 10 (i.e., embossment frequency) per unit area of tissue-towel paper product 10. To those of skill in the art, this relationship is known as the E factor. The E factor is generally defined as:

$$E=S/N\times 100$$

wherein: S=the average area of the individual embossment N=the number of embossments per unit area of paper The tissue-towel paper product 10 of the present invention is generally provided with about 5 to 25 embossments/inch$^2$ of paper (0.775 to 3.875 embossments/cm$^2$). The tissue-towel paper product 10 of the present invention preferably has an E factor preferably ranging from between about 0.0100 to 3 in$^4$/number of embossments (about 0.416 to 125 cm$^4$/number of embossments), more preferably between about 0.0125 to 2 in$^4$/number of embossments (about 0.520 to 83.324 cm$^4$/number of embossments), and even more preferably between about 0.0150 to 1 in$^4$/number of embossments (about 0.624 to 41.62 cm$^4$/number of embossments). Without desiring to be bound by theory, it is believed that a high E factor can provide embossing that does not stress a fibrous substrate to compress the void space. Thus, embossing web substrates in such a manner can produce a tissue-towel paper product that appears softer than previous embossed products.

The embossing pattern of the present invention can also provide fibrous substrate having an absorbent capacity preferably greater than about 20.00 g water/g material, more preferably greater than about 21.50 g water/g material, yet still more preferably greater than about 22.00 g water/g material, and most preferably greater than about 23.0 g water/g material.

Returning again to FIG. 1, embossments 14 (also collectively referred to herein as embossment region 30) are often provided as standard plane geometrical shapes such as circles, ovals, quadrilaterals, and the like, either alone or in combination. For such plane geometry figures, the area of an individual embossment 14 can be readily derived from well known mathematical formulas. For more complex shapes, methods to calculate the area of the embossment known to those of skill in the art may be used. Additionally, embossments 14, or embossment regions 30 are generally arranged in a repeating pattern. One of skill in the art should easily be able to calculate the number of embossments per unit area. The embossment frequency can be calculated as the quotient of the number of embossments provided within the known area.

In embodiments similar to those shown in FIG. 1, the non-random patterns of embossments 14 (or regions of embossments 30) generally comprise more than one corresponding curvilinear sub-pattern. These embossments 14 of the tissue-towel product 10 are generally arranged in a way that the geometric centers of each embossment region 30 of the repeating pattern lines up in either one or both of the MD and CD. In other words, the pattern repeat for the individual embossments 14 of the tissue-towel paper product 10 is generally equal to the overall size of the collective embossments 14 (embossment region 30). However, while providing such similar patterns may be convenient, it has been found that such arrangements can create z-direction stretch marks in such a tensioned tissue-towel paper product 10 when the web substrate 12 is subject to an applied tension T. These stretch marks can create a substantial amount of z-direction structure to a tensioned web substrate 12 causing defects in the web substrate 12 and imperfections in the finally produced tissue-towel paper product 10.

Without desiring to be bound by theory, it is believed that the relationships between stress ($\sigma_m$) and strain ($\epsilon_m$) can be utilized to determine the impact upon a specific pattern of embossments 14 on a tissue-towel paper product 10. It should be well known to those of skill in the art that stress ($\sigma_m$) is actually a point function and by calculation, the stress point is generally determined to be localized to the center 16 of any particular embossment 14 (or region of embossment 14). Further, as would be known to one of skill in the art, finite element analysis predictions can be used to substantiate and localize the location of the stress ($\sigma_m$). Additionally, it should be known that any stresses due to the embossment 14 pattern of a tissue-towel paper product 10 are dependent upon a combination of the embossment 14 pattern, the directionality of the embossment 14 pattern, and the induced tension T in the web substrate 12 of the tissue-towel paper product 10. Likewise, a CD tension T in the web substrate forming the tissue-towel paper product 10, with alone or in combination with MD tension, can provide high stress points 16 directed in the CD or in any direction between the MD and CD.

If one were to consider that a normal stress, $\sigma_m$, acting in the MD of each embossment of the embossment 14 pattern acts equally upon each and every embossment 14 of the embossment 14 pattern in embossment region 30 of a web substrate 12 of the tissue-towel paper product 10, then the deformation of the web substrate 12 attributed to the normal stress, $\sigma_m$, can be analyzed. This deformation attributed to the normal MD stress, $\sigma_m$, is known to those of skill in the art as normal strain, $\epsilon_m$, in the MD. Since normal stress, $\sigma_m$, acts on each embossment 14 of the embossment 14 pattern, the embossment 14 pattern must elongate in the MD, and at the same time contract in both the CD and the z-directions. The resulting new length of the web substrate 12 of the tissue-towel paper product 10 in any direction is a function of the original web substrate 12 length plus $\epsilon_m$ times its original length. As would be known to one of skill in the art, the normal strain, $\epsilon_m$, in each direction can be calculated using Hooke's law. Without desiring to be bound by theory, it is believe that the change in length in the z-direction, and the change in length in the CD caused by the amount of tension T provided by the process upon web substrate 12 is likely the cause for the appearance of the heretofore recognized stress related marks.

It is also believed that one of skill in the art would understand that the appearance of such stress related marks in a tensioned web substrate 12 could be caused by a deflection of web substrate 12. In other words, as the web substrate 12 of tissue-towel paper product 10 is subject to an applied tension T, the only amount of significant movement available to the tensioned web substrate is in the positive and/or negative z-direction. Thus, the alignment of embossments 14 of the embossment 14 pattern aligns the stress points in the web substrate 12 with the centers 16 of the embossment 14 pattern thereby providing for an aligned axis of force F upon which web substrate 12 can rotate about to create machine direction puckers in the web substrate 16 in the positive and/or negative z-direction. The actual rotation of the web substrate 12 about the aligned axis of force F produced by the aligned centers of stress of the embossment 14 pattern can provide the web substrate 12 with the ability to rotate about the aligned axis of force F.

Figure 2:
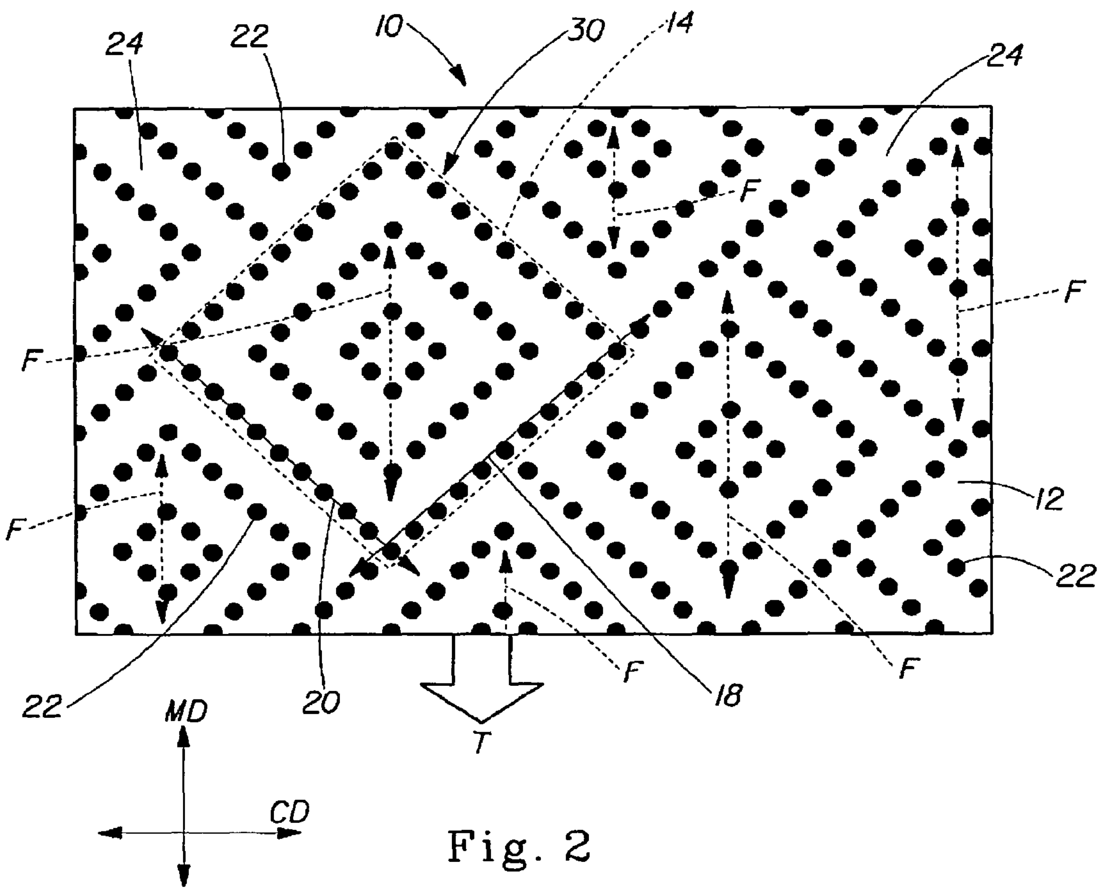
FIG. 2 is an exemplary embossment pattern having offset embossment regions in accordance with the present invention; and, FIG. 3 is an exemplary grid pattern useful for the Horizontal Full Sheet (HFS) test method referred to herein.

Referring to FIG. 2, without desiring to be bound by theory, it has been surprisingly found that shifting, or offsetting, an embossment 14, or embossment regions 30 so that the embossment region 30 produces non-aligned (or non-collinear) points of stress within a embossment region 30 disposed across the width of the web substrate 12 forming tissue-towel paper product 10 provides for discontinuity in the previously recognized aligned axis of force F due to an applied tension T. Thus, in order to reduce deflection of the web substrate 12 in the z-direction, it was surprisingly found that the pattern of embossments 14 should be provided with a shift, or offset, between embossment regions 30. A embossment region 30 is considered to be a subdivision into which web substrate 10 can logically be divided.

As shown, an embossment region 30 is bounded by a first axis 18 and a second axis 20. However, one of skill in the art would be able to bound any particular embossment region 30 by any number of axes that provide for the logical subdivision of web substrate 10 into it constituent embossment pattern regions. First axis 18 and second axis 20 can be oriented in a substantially orthogonal relationship. The first axis 18 of embossment region 30 is preferably generally collinear with an adjacent embossment region 30. More preferably, the first axis 18 of embossment region 30 is only collinear with the first axis of an embossment region 30 proximate, or adjacent, embossment region 30. In another preferred embodiment, the combination of each first axis 18 from each embossment region 30 are preferably collectively elongate. Preferably, the combination of each second axis 20 from each embossment region 30 are preferably collectively parallel and non-collinear. While, in a preferred embodiment, the first axis 18 and the second axis 20 are orthogonal, the first axis 18 and second axis 20 can differ from an orthogonal orientation. Thus, substantially orthogonal should be considered to include any angular relationship between the first axis 18 and second axis 20 of an embossment region 30.

Finite element analysis attributes deformation in the web substrate 12 to the normal stress, $\sigma_m$, due to an applied tension T. This analysis shows that a typical pattern as shown in FIG. 1 elongates in the MD and contracts in both the CD- and z-directions. Without desiring to be bound by theory, if one were to assume that the tissue-towel paper product 10 has negligible z-direction length, then Hooke's law requires that the tissue-towel paper product 10 cannot change its length in the z-direction. In other words, reducing the z-direction component of the embossed web substrate 12 due to an applied tension T reduces the ability of the centers of normal stress, $\sigma_m$ acting on each region of embossment 30 of web substrate 12 to form an aligned axis of force F in the web material 12. Thus, by providing embossment region 30 in a configuration wherein the repeating embossment 14 pattern is offset, as shown in FIG. 2 by way of example, does not facilitate the alignment of the resulting forces F from the centers of normal stress, $\sigma_m$, from each region of embossment 30 resulting from the applied tension T to the web substrate 12 of tissue-towel paper product 10.

As shown in FIG. 2, the pattern of embossments 14 can be provided as two or more of a repeating pattern of embossing regions 30, collectively forming a parallelogram (including, but not limited to, rectangles, rhomboids, diamonds and the like) repeating in the MD. As shown, one embossing region 30 can comprise a plurality of discrete, distinctive lands 22 and an optional background matrix 24. One repeating pattern in the MD can be determined by comparing contiguous patterns of the same length in the MD. When the contiguous patterns have the same length in the MD over the entire length of the tissue-towel paper product 10, the resulting pattern is a repeating pattern. One repeating pattern in the CD may be determined by the width of the tissue-towel paper product 10. Therefore, the area of the repeating pattern can be defined as the product of the length of one repeating pattern in the MD and the CD width of the tissue-towel paper product 10. Additionally, the discrete distinctive lands 22 can form the boundaries between adjacent embossing regions 30.

The background matrix 24, if used and/or required, can comprise a plurality of discrete embossed elements, an isomorphic pattern of spaced three-dimensional recesses separated by inter-connected lands, an amorphous pattern of spaced three-dimensional recesses separated by inter-connected lands, unprocessed portions of web material 12, and combinations thereof. In the embodiment shown in FIG. 2, a substantially unprocessed land is defined by having a plurality of discrete embossed elements comprising embossment region 30 provided therein. Herein, "discrete" means that the adjacent elements are not contiguous with each other. In the embodiment shown in FIG. 2, the adjacent embossed elements comprising embossment region 30 are not contiguous with each other. Herein, "distinctive" means that the land is discernable and distinguishable from the background matrix 24. Herein, "substantially surrounded" means that the land is surrounded by a plurality of discrete elements which do not form a closed line. As shown, each discrete, distinctive embossment 14 comprising embossment region 30 is rendered discernable and distinguishable from the background matrix 24 by providing no embossed elements within the background matrix 24. In a preferred embodiment, the discrete element and the discrete, distinctive lands 22 are relatively different level in height as a result of such embossing.

A web substrate 12 comprising embossment region 30 can be converted into a tissue-towel paper product 10 by any technique known to those of skill in the art. Such converting can include providing web substrate 12 with perforations thereon in order to provide a tissue-towel paper product 10 that is separable into discrete sheets. Such discrete sheets of tissue-towel paper product 10 can be utilized for paper towels, bath tissue, facial tissue, and the like. Additionally, web substrate 12 comprising embossment regions 30 can be wound upon a core material in order to provide a 'rolled-up' tissue-towel paper product 10. Equipment suitable for such winding can include methods known to those of skill in the art including, but not limited to, center core winders and surface winders.

Test Methods

The following describe the test methods utilized by the instant application in order to determine the values consistent with those presented herein.

Horizontal Full Sheet (HFS)

The Horizontal Full Sheet (HFS) test method determines the amount of distilled water absorbed and retained by the product of the present invention. This method is performed by first weighing a sample of the paper to be tested (referred to herein as "dry weight" of the paper), then thoroughly wetting the paper, draining the wetted paper in a horizontal position, and then reweighing (referred to herein as "wet weight" of the paper). The absorptive capacity of the paper is then computed as the amount of water retained in units of grams of water absorbed by the paper. When evaluating different paper samples, the same size of paper is used for all samples tested.

The apparatus for determining the HFS capacity of paper comprises the following equipment: an electronic top loading balance with a sensitivity of at least ±0.01 g and a minimum capacity of 1200 g. The balance is positioned on a balance table and stone slab to minimize any vibration effects of the floor or bench top weighing. The balance should also be provided with a balance pan (approximately 430 mm×380 mm) capable of handling the size of the product tested.

Figure 3:
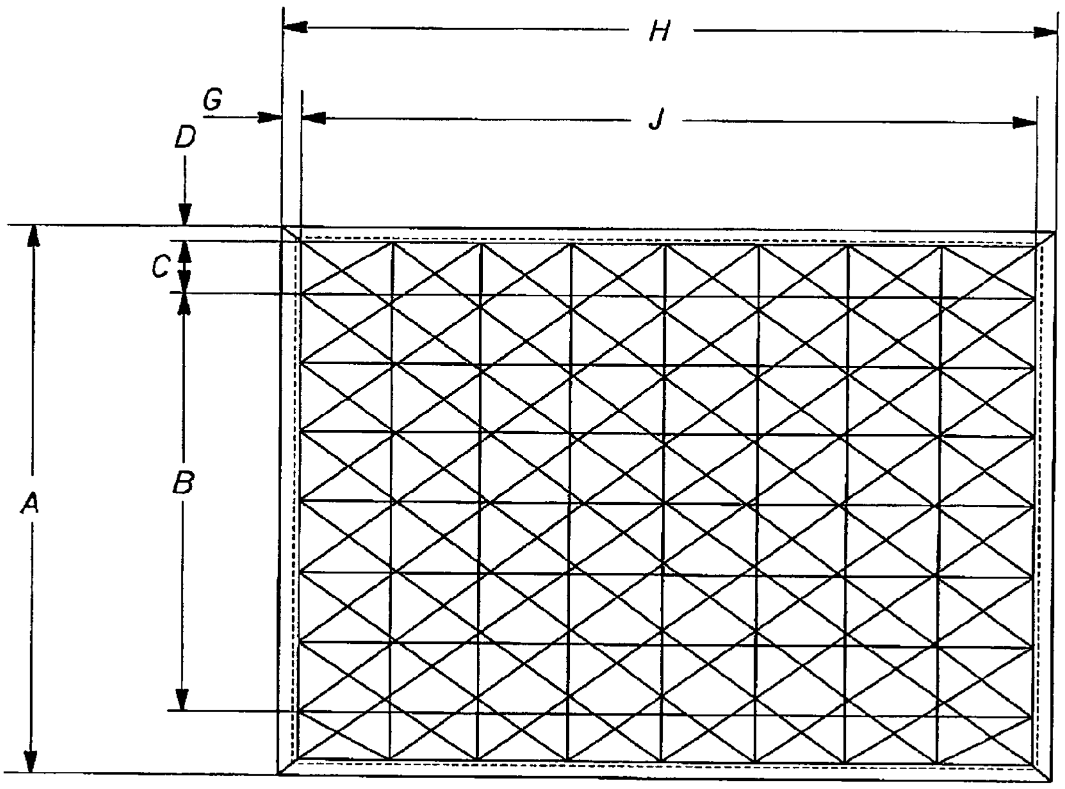

A sample support rack and sample support rack cover are also used. Both the sample support rack and the sample support rack cover are generally comprised of a lightweight metal frame strung with 0.012 in (0.305 cm) diameter monofilament line so as to form a grid of approximately 2.0 $in^2$ (5.08 cm). The frame is strung a second time with monofilament line to form a diagonal grid. An exemplary and measured grid pattern is shown in FIG. 3. The following dimensions are representative of the sample support rack used for the HFS test method: A=13.75 inches (349.25 mm); B=6 equal spaces at 1.750 inches=10.500 inches (44.45 mm=266.70 mm); C=1.25 inches (31.75 mm); D =0.375 inches (9.525 mm); G=0.375 inches (9.525 mm); H=16.75 inches (425.45 mm); and J =8 equal spaces at 2.000 inches=16.000 inches (5.08 mm=406.4 mm). The size of the support rack and cover is such that the sample size can be conveniently placed between the two.

The HFS test method is performed in an environment maintained at 23±1° C. and 50±2% relative humidity. A water reservoir or tub filled with distilled water at 23±1° C. to a depth of 3 in (7.6 cm) is used for this purpose.

The empty sample support rack is then placed on the balance with the special balance pan. The balance is then tared. The product to be tested is placed on the sample support rack and weighed on the balance to the nearest 0.01 g. The support rack cover is placed on top of the support rack. The sample is then submerged in a water reservoir. After the sample has been submerged for 30 seconds, the sample support rack and cover are gently raised out of the reservoir. The sample support rack cover is then carefully removed.

The sample and sample support rack are oriented to horizontal and allowed to drain in a horizontal orientation for 120±5 seconds, taking care not to excessively shake or vibrate the sample. Carefully dry the edges of the support rack with an absorbent towel to remove excess water from the frame. The wet sample and the support rack are then weighed on the previously tared balance. This weight is recorded to the nearest 0.01 g. This is the wet weight of the sample.

The gram per paper sample absorptive capacity of the sample is defined as the wet weight of the paper minus the dry weight of the paper. Thus, the absorbent capacity is defined, and calculated, as:

$$\text{Absorbent Capacity} = \frac{\text{wet weight of the paper} - \text{dry weight of the paper}}{\text{dry weight of the paper}}$$

Embossment Height Test Method

Embossment height is measured using an Optical 3D Measuring System MikroCAD compact for paper measurement instrument (the "GFM MikroCAD optical profiler instrument") and ODSCAD Version 4.0 software available from GFMesstechnik GmbH, WarthestraBe E21, D14513 Teltow, Berlin, Germany. The GFM MikroCAD optical profiler instrument includes a compact optical measuring sensor based on digital micro-mirror projection, consisting of the following components:

A) A DMD projector with 1024×768 direct digital controlled micro-mirrors.

B) CCD camera with high resolution (1300×1000 pixels).

C) Projection optics adapted to a measuring area of at least 27×22 mm.

D) Recording optics adapted to a measuring area of at least 27×22 mm; a table tripod based on a small hard stone plate; a cold-light source; a measuring, control, and evaluation computer; measuring, control, and evaluation software, and adjusting probes for lateral (X-Y) and vertical (Z) calibration.

E) Schott KL1500 LCD cold light source.

F) Table and tripod based on a small hard stone plate.

G) Measuring, control and evaluation computer.

H) Measuring, control and evaluation software ODSCAD 4.0.

I) Adjusting probes for lateral (x-y) and vertical (z) calibration.

The GFM MikroCAD optical profiler system measures the height of a sample using the digital micro-mirror pattern projection technique. The result of the analysis is a map of surface height (Z) versus X-Y displacement. The system should provide a field of view of 27×22 mm with a resolution of 21 μm. The height resolution is set to between 0.10 μm and 1.00 μm. The height range is 64,000 times the resolution. To measure a fibrous structure sample, the following steps are utilized:

1. Turn on the cold-light source. The settings on the cold-light source are set to provide a reading of at least 2,800 k on the display.
2. Turn on the computer, monitor, and printer, and open the software.
3. Select "Start Measurement" icon from the ODSCAD task bar and then click the "Live Image" button.
4. Obtain a fibrous structure sample that is larger than the equipment field of view and conditioned at a temperature of 73° F.±2° F. (about 23° C.±1° C.) and a relative humidity of 50%±2% for 2 hours. Place the sample under the projection head. Position the projection head to be normal to the sample surface.
5. Adjust the distance between the sample and the projection head for best focus in the following manner. Turn on the "Show Cross" button. A blue cross should appear on the screen. Click the "Pattern" button repeatedly to project one of the several focusing patterns to aid in achieving the best focus. Select a pattern with a cross hair such as the one with the square.

Adjust the focus control until the cross hair is aligned with the blue "cross" on the screen.

6. Adjust image brightness by changing the aperture on the lens through the hole in the side of the projector head and/or altering the camera gains setting on the screen. When the illumination is optimum, the red circle at the bottom of the screen labeled "I.O." will turn green.
7. Select technical surface/rough measurement type.
8. Click on the "Measure" button. When keeping the sample still in order to avoid blurring of the captured image.
9. To move the data into the analysis portion of the software, click on the clipboard/man icon.

Click on the icon "Draw Cutting Lines." On the captured image, "draw" six cutting lines (randomly selected) that extend from the center of a positive embossment through the center of a negative embossment to the center of another positive embossment. Click on the icon "Show Sectional Line Diagram." Make sure active line is set to line 1. Move the cross-hairs to the lowest point on the left side of the computer screen image and click the mouse. Then move the cross-hairs to the lowest point on the right side of the computer screen image on the current line and click the mouse. Click on the "Align" button by marked point's icon. Click the mouse on the lowest point on this line and then click the mouse on the highest point of the line. Click the "Vertical" distance icon. Record the distance measurement. Increase the active line to the next line, and repeat the previous steps until all six lines have been measured. Perform this task for four sheets equally spaced throughout the Finished Product Roll, and four finished product rolls for a total of 16 sheets or 96 recorded height values. Take the average of all recorded numbers and report in mm, or μm, as desired. This number is the embossment height.

All documents cited in the Detailed Description of the Invention are, in relevant part, incorporated herein by reference; the citation of any document is not to be construed as an admission that it is prior art with respect to the present invention. To the extent that any meaning or definition of a term in this written document conflicts with any meaning or definition of the term in a document incorporated by reference, the meaning or definition assigned to the term in this written document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A web substrate comprising a plurality of embossment regions, each of said embossment regions having a geometric center and being bounded by a plurality of axes; and, wherein a first embossment region of said plurality of embossment regions has only one axis, the first axis, of said plurality of axes collinear with an adjacent second embossment region; and wherein adjacent said embossment regions are offset such that their respective said geometric centers are not aligned in either a machine direction or a cross-machine direction.

2. The web substrate according to claim 1 wherein only said first axis of said first embossment region is collinear with a first axis of said second embossment region.

3. The web substrate according to claim 1 wherein each embossment region comprises a plurality of embossments, each of said embossments being bounded by a substantially unprocessed land.

4. The web substrate according to claim 1 wherein each of said embossments is formed by molding the web substrate between an emboss knob and a gap.

5. The web substrate according to claim 1 wherein said plurality of embossment regions is a repeating pattern.

6. The web substrate according to claim 1 wherein at least one embossment region of said plurality of embossment regions further comprises a substantially unprocessed land, said substantially unprocessed land comprising a background matrix.

7. The web substrate according to claim 1 wherein said web substrate has an E factor ranging from between about 0.0150 $inches^4$/number of embossments and 1.0000 $inches^4$/number of embossments.

8. The web substrate according to claim 1 wherein said embossment region has an average embossment height of at least 500 μm.

9. The web substrate according to claim 1 wherein said substrate is a tissue-towel paper product.

10. An embossment pattern for a web substrate wherein said embossment pattern comprises;

a plurality of deep-nested embossment regions, each of said embossment regions having a geometric center and being bounded by a plurality of axes;

wherein only one axis, the first axis, of said plurality of axes bounding each of adjacent embossment regions of said plurality of embossment regions is collinear, wherein the web substrate comprises from about 5 to 25 embossments/$inch^2$; and wherein adjacent emboss regions are offset such that their respective geometric centers are not aligned in either the machine direction or the cross-machine direction.

11. The embossment pattern according to claim 10 wherein each of said embossments is formed by molding the web substrate between an emboss knob and a gap.

* * * * *